(12) United States Patent
Wu et al.

(10) Patent No.: US 12,095,179 B2
(45) Date of Patent: Sep. 17, 2024

(54) ELECTRONIC DEVICE

(71) Applicant: PEGATRON CORPORATION, Taipei (TW)

(72) Inventors: Chien-Yi Wu, Taipei (TW); Chao-Hsu Wu, Taipei (TW); Hau Yuen Tan, Taipei (TW); Cheng-Hsiung Wu, Taipei (TW); Chen-Kuang Wang, Taipei (TW); Tse-Hsuan Wang, Taipei (TW); Sheng-Chin Hsu, Taipei (TW); Shih-Keng Huang, Taipei (TW); Chia-Hung Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 155 days.

(21) Appl. No.: 17/898,341

(22) Filed: Aug. 29, 2022

(65) Prior Publication Data

US 2023/0107947 A1  Apr. 6, 2023

(30) Foreign Application Priority Data

Oct. 5, 2021 (TW) ................................. 110137082

(51) Int. Cl.
| | |
|---|---|
| *H01Q 5/50* | (2015.01) |
| *G06F 1/16* | (2006.01) |
| *H01Q 1/22* | (2006.01) |
| *H01Q 1/48* | (2006.01) |
| *H01Q 13/10* | (2006.01) |

(52) U.S. Cl.
CPC ............. *H01Q 5/50* (2015.01); *G06F 1/1626* (2013.01); *H01Q 1/2291* (2013.01); *H01Q 1/48* (2013.01); *H01Q 13/106* (2013.01)

(58) Field of Classification Search
CPC ............. H01Q 5/371; H01Q 7/00; H01Q 1/38
See application file for complete search history.

(56) References Cited

U.S. PATENT DOCUMENTS

| 10,542,130 B1* | 1/2020 | Lo | .......................... | H04M 1/026 |
| 2019/0123423 A1* | 4/2019 | Wu | ......................... | H01Q 1/243 |

FOREIGN PATENT DOCUMENTS

| TW | 201814965 | 4/2018 |
| TW | I688159 | 3/2020 |

* cited by examiner

*Primary Examiner* — Ricardo I Magallanes
*Assistant Examiner* — Aladdin Abdulbaki
(74) *Attorney, Agent, or Firm* — J.C. PATENTS

(57) ABSTRACT

An electronic device includes a metal back cover and an antenna module. The metal back cover includes a slit. The antenna module is separated from the metal back cover and disposed far away from the slit. The antenna module includes an antenna radiator, a first ground radiator, and a connection radiator. The antenna radiator includes a first section, a second section, and a third section that are sequentially connected and form bends, and the first section has a feeding end. A first slot is formed between the first ground radiator, the first section, the second section, and a part of the third section. A width and length of the first slot are associated with a center frequency and impedance matching of a high frequency band.

10 Claims, 10 Drawing Sheets

ELECTRONIC DEVICE

CROSS-REFERENCE TO RELATED APPLICATION

This application claims the priority benefit of Taiwan application serial no. 110137082, filed on Oct. 5, 2021. The entirety of the above-mentioned patent application is hereby incorporated by reference herein and made a part of this specification.

BACKGROUND

Technology Field

The disclosure relates to an electronic device, and more particularly, to an electronic device with an antenna module.

Description of Related Art

At present, if a metal back cover is used in a tablet device, an internal antenna is affected by the metal back cover, and it is difficult for the antenna to perform well.

SUMMARY

The disclosure provides an electronic device with a metal back cover, and an antenna module may have a good performance.

An electronic device in the disclosure includes a metal back cover and an antenna module. The metal back cover includes a slit. The antenna module is located on the inside of the metal back cover and separated from the metal back cover, and the antenna module is disposed far away from the slit. The antenna module includes an antenna radiator, a first ground radiator, and a connection radiator. The antenna radiator includes a first section, a second section, and a third section that are sequentially connected, and the first section has a feeding end. The first section, the second section, and the third section form multiple bends. The first ground radiator is disposed beside the antenna radiator, and the first section is located between the third section and the first ground radiator. The connection radiator connects the third section with the first ground radiator, so that a first slot is formed among the first ground radiator, the first section, the second section, and a part of the third section, and a length and a width of the first slot are associated with a center frequency and impedance matching of a second high frequency band.

The antenna module includes a substrate, a second ground radiator, and a floating radiator. The substrate has a first surface and a second surface opposite to each other. The antenna radiator, the connection radiator, and the first ground radiator are disposed on the first surface, and the second ground radiator and the floating radiator are disposed on the second surface. The first ground radiator is connected to the second ground radiator.

The second ground radiator includes a fourth section. A projection of the fourth section onto the first surface at least partially overlaps the first ground radiator. A second slot is formed between the fourth section and the floating radiator. A length and a width of the second slot are associated with the center frequency and the impedance matching of the second high frequency band and a center frequency and impedance matching of a third high frequency band.

The second ground radiator includes a fifth section extending from the fourth section. A projection of the fifth section onto the first surface is located between the first ground radiator and the third section. The fifth section is associated with a center frequency of a first high frequency band.

The metal back cover includes a bottom wall and a side wall connected to the bottom wall, and the slit is formed between the bottom wall and the side wall.

The slit has a first end and a second end opposite to each other. The third section has a terminal far away from the second section. A distance between a projection of the terminal onto the bottom wall and a projection of the first end onto the bottom wall is between 5 mm and 10 mm.

A distance between the antenna module and the bottom wall is between 7 mm and 10 mm, and a distance between the antenna module and the side wall is between 0.4 mm and 1.5 mm.

The antenna module excites at a low frequency band, and a length of the slit is between 0.5 times and 0.75 times a wavelength of the low frequency band.

The electronic device further includes a conductor connected to the first ground radiator and the metal back cover.

The substrate has the first surface. The antenna radiator, the connection radiator, and the first ground radiator are disposed on the first surface, and two ends of the first ground radiator are located outside a projection of the conductor onto the first surface.

Based on the above, the metal back cover is used for the electronic device in the disclosure, and the electronic device has the fine-looking appearance. In the conventional electronic device with the metal back cover, there is no slot on the metal back cover. The antenna efficiency is affected by the metal back cover, and the power of the antenna module is convergent in a direction toward a front side of the electronic device. The metal back cover of the electronic device in the disclosure is provided with the slit, so that the power of the antenna module is not convergent in a single axial direction, and the antenna efficiency may be improved. In addition, the first ground radiator of the antenna module is disposed beside the antenna radiator, and the first section of the antenna radiator is located between the third section and the first ground radiator. The first slot is formed among the first ground radiator of the antenna module, the first section, the second section, and the part of the third section. With the above design, the antenna module may resonate at multiple frequency bands.

DETAILED DESCRIPTION OF DISCLOSED EMBODIMENTS

Figure 1:
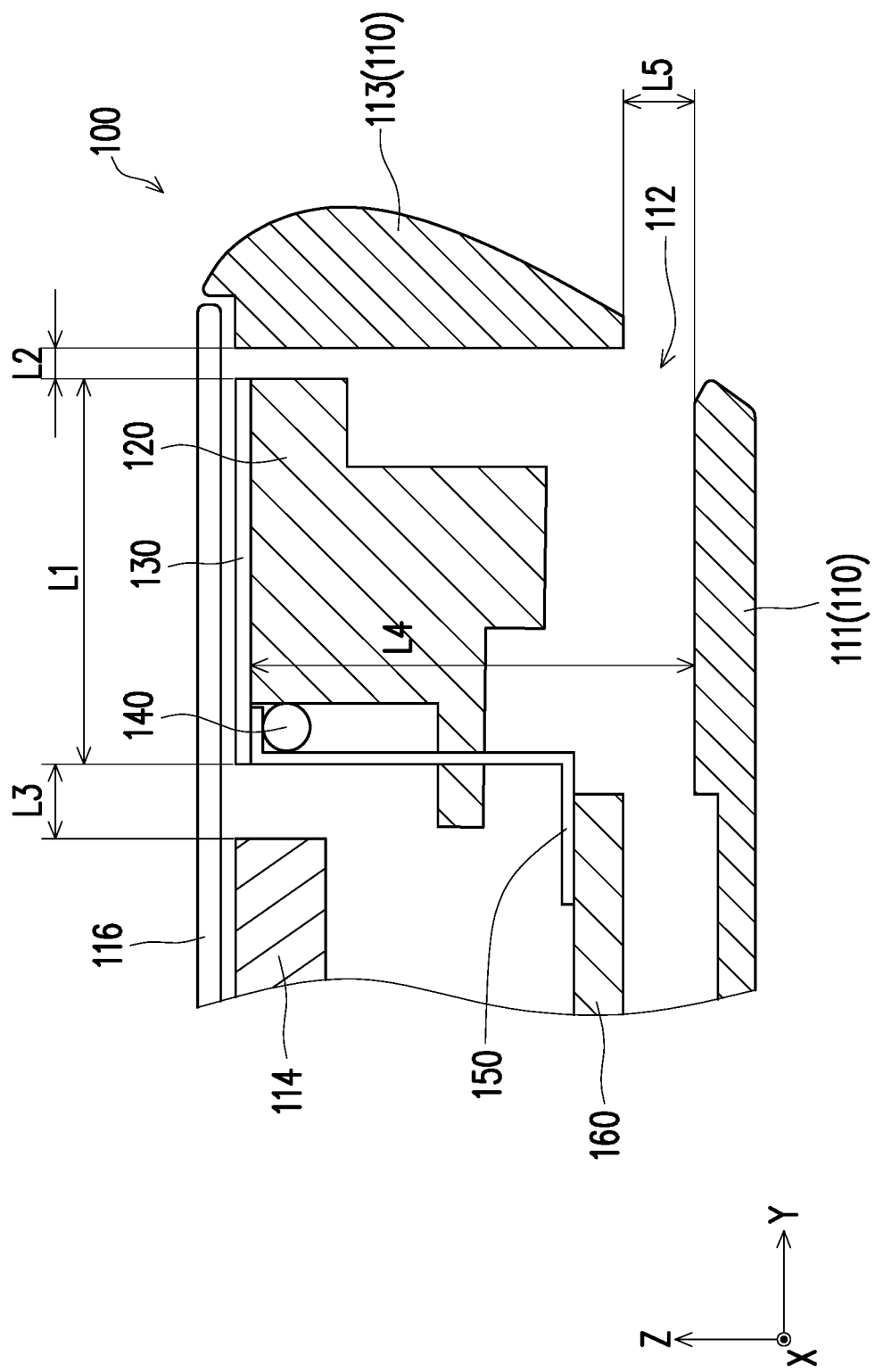
FIG. 1 is a schematic partial cross-sectional diagram of an electronic device according to an embodiment of the disclosure.

FIG. 1 is a schematic partial cross-sectional diagram of an electronic device according to an embodiment of the disclosure. Referring to FIG. 1, in this embodiment, an electronic device 100 is, for example, a tablet computer, but the type of the electronic device 100 is not limited thereto. FIG. 1 is a partial cross-section of the tablet computer near a bezel area.

In this embodiment, the electronic device 100 includes a metal back cover 110 and an antenna module 130. The antenna module 130 is located on the inside of the metal back cover 110 and separated from the metal back cover 110.

In addition, the electronic device 100 further includes a bracket 120, a touch module 114, a conductor 150, and a circuit board 160. The bracket 120, the touch module 114, the conductor 150, and the circuit board 160 are disposed on the inside of the metal back cover 110. The antenna module 130 is disposed on the bracket 120, and the bracket 120 is made of an insulating material, such as plastic. However, the disclosure is not limited thereto.

According to FIG. 1, the antenna module 130 is disposed in the bezel area of the electronic device 100, and a width L1 of the antenna module 130 is, for example, 6.5 mm. The metal back cover 110 includes a bottom wall 111 and a side wall 113 connected to the bottom wall 111. A distance L2 between the antenna module 130 and the side wall 113 is between 0.4 mm and 1.5 mm, for example, 0.5 mm.

A distance L3 between the antenna module 130 and the touch module 114 (metal) is between 0.5 mm and 1.5 mm, for example, 1 mm. A distance L4 between the antenna module 130 and the bottom wall 111 is between 7 mm and 10 mm, for example, 8.1 mm.

The conductor 150 is connected to the antenna module 130 and the metal back cover 110. Specifically, the conductor 150 is connected to the antenna module 130 and goes down to the circuit board 160 along a Z-axis, and the circuit board 160 may be connected to the metal back cover 110 through other conductive members (not shown). Therefore, the antenna module 130 may be connected to the metal back cover 110 through the conductor 150 and the circuit board 160. In an embodiment, the conductor 150 may be directly connected to the metal back cover 110 without going through the circuit board 160.

Figure 2:
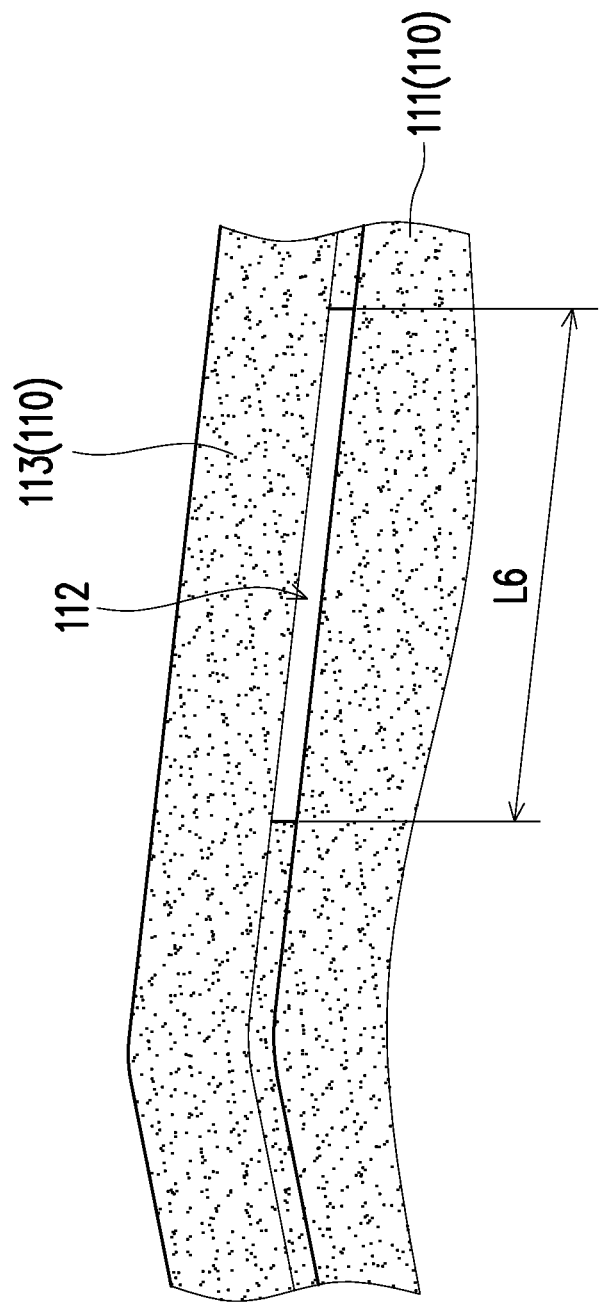
FIG. 2 is a schematic partial perspective diagram of the electronic device of FIG. 1.

FIG. 2 is a schematic partial perspective diagram of the electronic device of FIG. 1. Referring to FIGS. 1 and 2, in this embodiment, the metal back cover 110 includes a slit 112, and the slit 112 is formed between the bottom wall 111 and the side wall 113. The slit 112 may be a heat-dissipation opening of the electronic device 100, but the function of the slit 112 is not limited thereto. In this embodiment, a width L5 (FIG. 1) of the slit 112 is between 1 mm and 2.5 mm, for example, 1.81 mm.

In a conventional electronic device with the metal back cover, there is no slot on the metal back cover. Its antenna efficiency is affected by the metal back cover, and the power of the antenna module is convergent in a direction (Z direction) toward a front side of the electronic device. The metal back cover 110 is used for the electronic device 100 in this embodiment, and the electronic device 100 also has a fine-looking appearance. The metal back cover 110 is provided with the slit 112, so that the power of the antenna module 130 is not convergent in a single axial direction (e.g., the Z direction).

Figure 3:
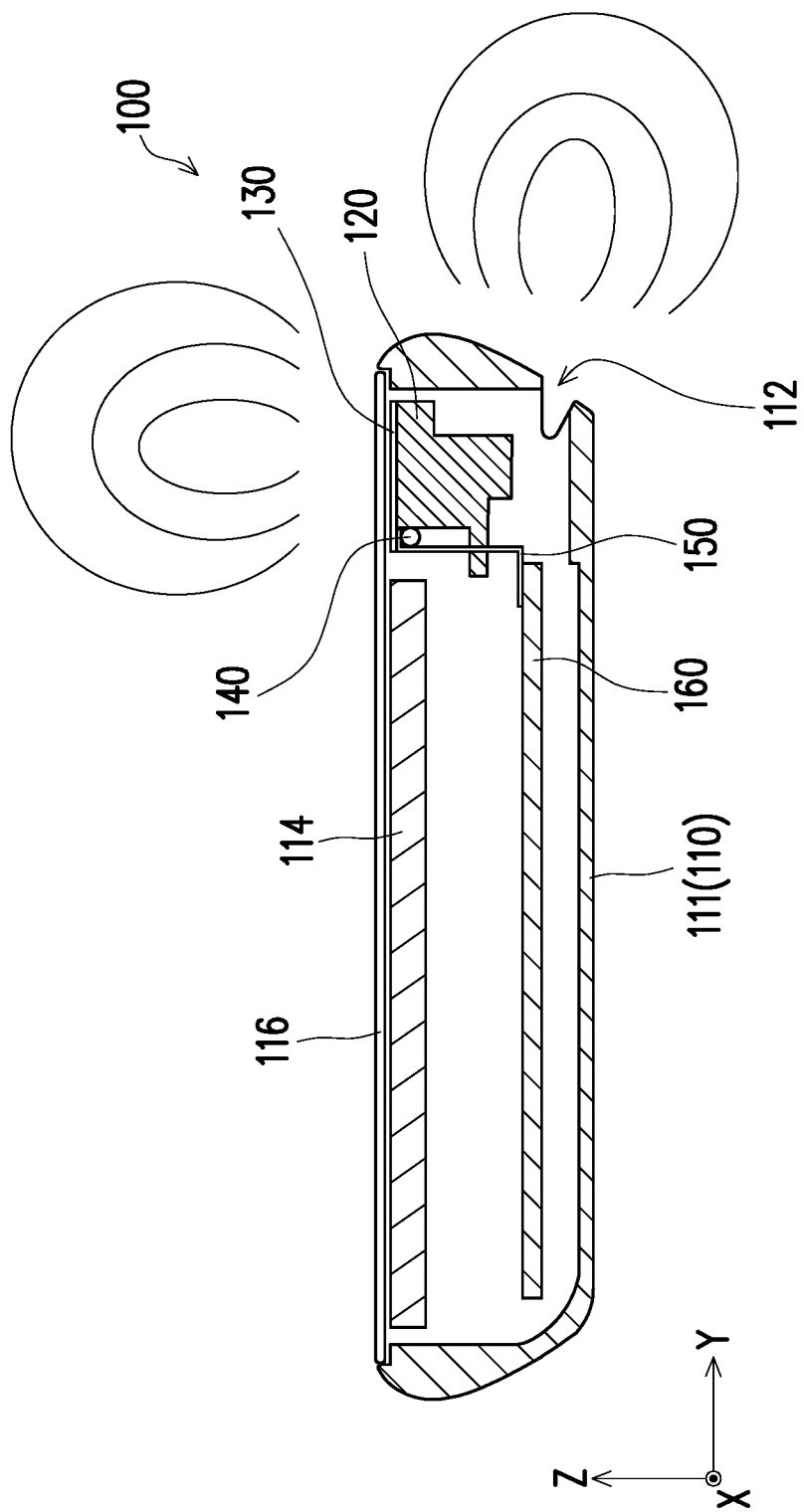
FIG. 3 is a schematic diagram of a direction of power emitted by an antenna module of the electronic device of FIG. 1.

Specifically, FIG. 3 is a schematic diagram of a direction of power emitted by an antenna module of the electronic device of FIG. 1. Referring to FIG. 3, in this embodiment, the antenna module 130 is, for example, an antenna of Wi-Fi 6E, which may excite at multiple frequency bands, such as Wi-Fi 2.4 GHz (2400 to 2500 MHz, i.e., a low frequency band), and Wi-Fi 5G and 6G (5150 to 7125 MHz). Signals of Wi-Fi 5G and 6G (5150 to 7125 MHz) are radiated toward the Z direction (a direction of a front cover 116).

In this embodiment, a length L6 (FIG. 2) of the slit 112 is between 0.5 times and 0.75 times a wavelength of 2.4 GHz, for example, 71.8 mm. Such a design enables radiant power of Wi-Fi 2.4G to be radiated toward a Y direction (a direction of the side wall 113) through the slit 112 and has a good performance, which effectively reduces the odds of the low frequency (2.4 GHz) being shielded by the metal back cover 110, resulting in the poor antenna efficiency.

Figure 4:
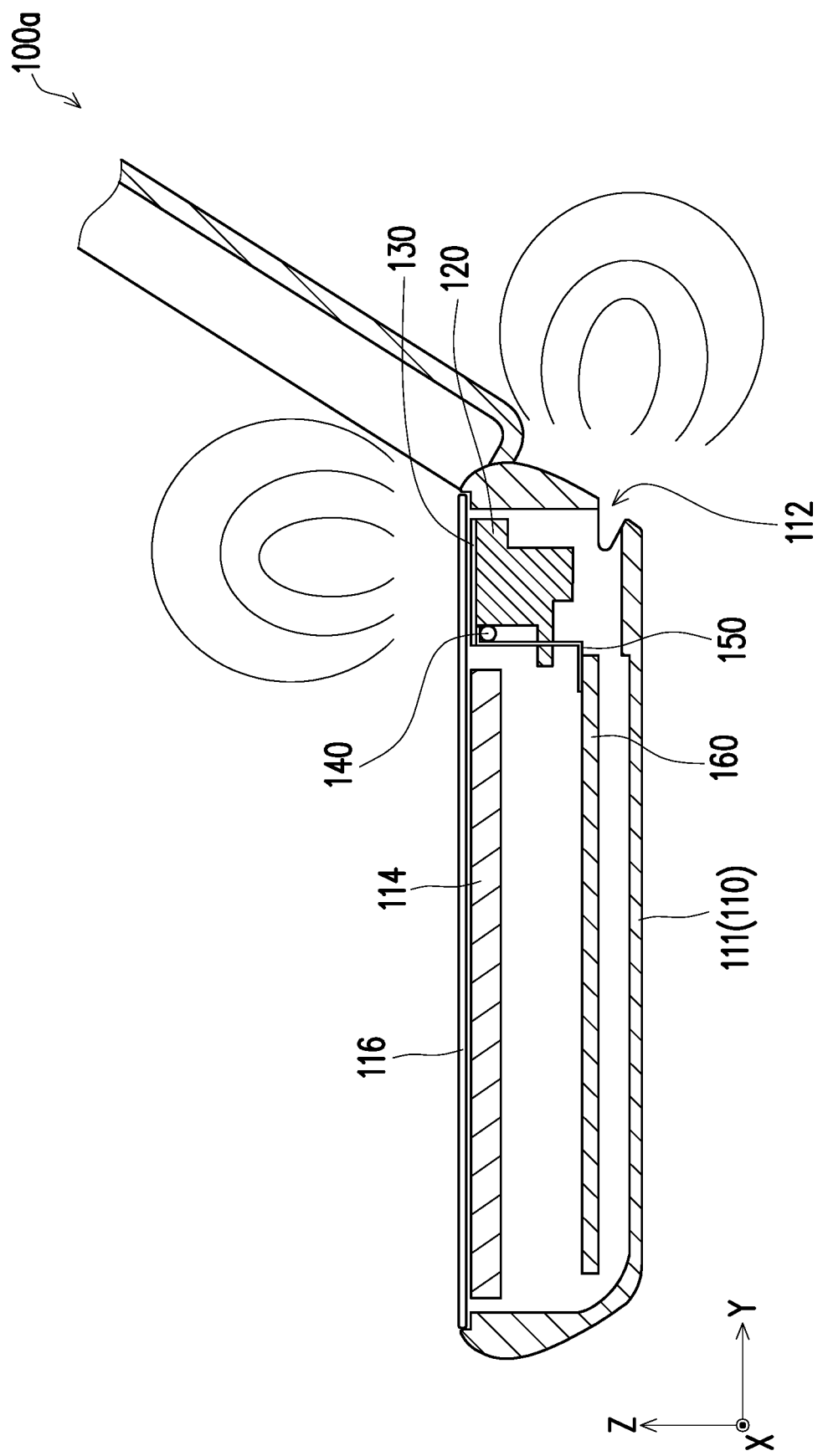
FIG. 4 is a schematic diagram of a direction of power emitted by an antenna module of an electronic device according to another embodiment of the disclosure.

FIG. 4 is a schematic diagram of a direction of power emitted by an antenna module of an electronic device according to another embodiment of the disclosure. Referring to FIG. 4, an electronic device 100a may be, for example, a notebook computer, and the antenna module 130 and the slit 112 are disposed on a lower body. Similarly, the radiant power of Wi-Fi 2.4G may be radiated toward the Y direction (the direction of the side wall 113) through the slit 112 to have the good performance.

In addition, returning to FIG. 1, in this embodiment, a distance between the antenna module 130 and the slit 112, that is, a difference between the distances L4 and L5, is between 5 mm and 8 mm, for example, 6.29 mm, which keeps a certain distance between the antenna module 130 and the metal back cover 110, and may reduce influence of the metal back cover 110 on performance of the antenna module 130. In addition, the design that there is a certain distance between the antenna module 130 and the metal back cover 110 is also different from a conventional resonance mechanism in which the antenna is closely attached to the slot for resonance, and the characteristics of the antenna are less affected by an offset tolerance of a coupling distance.

Figure 5:
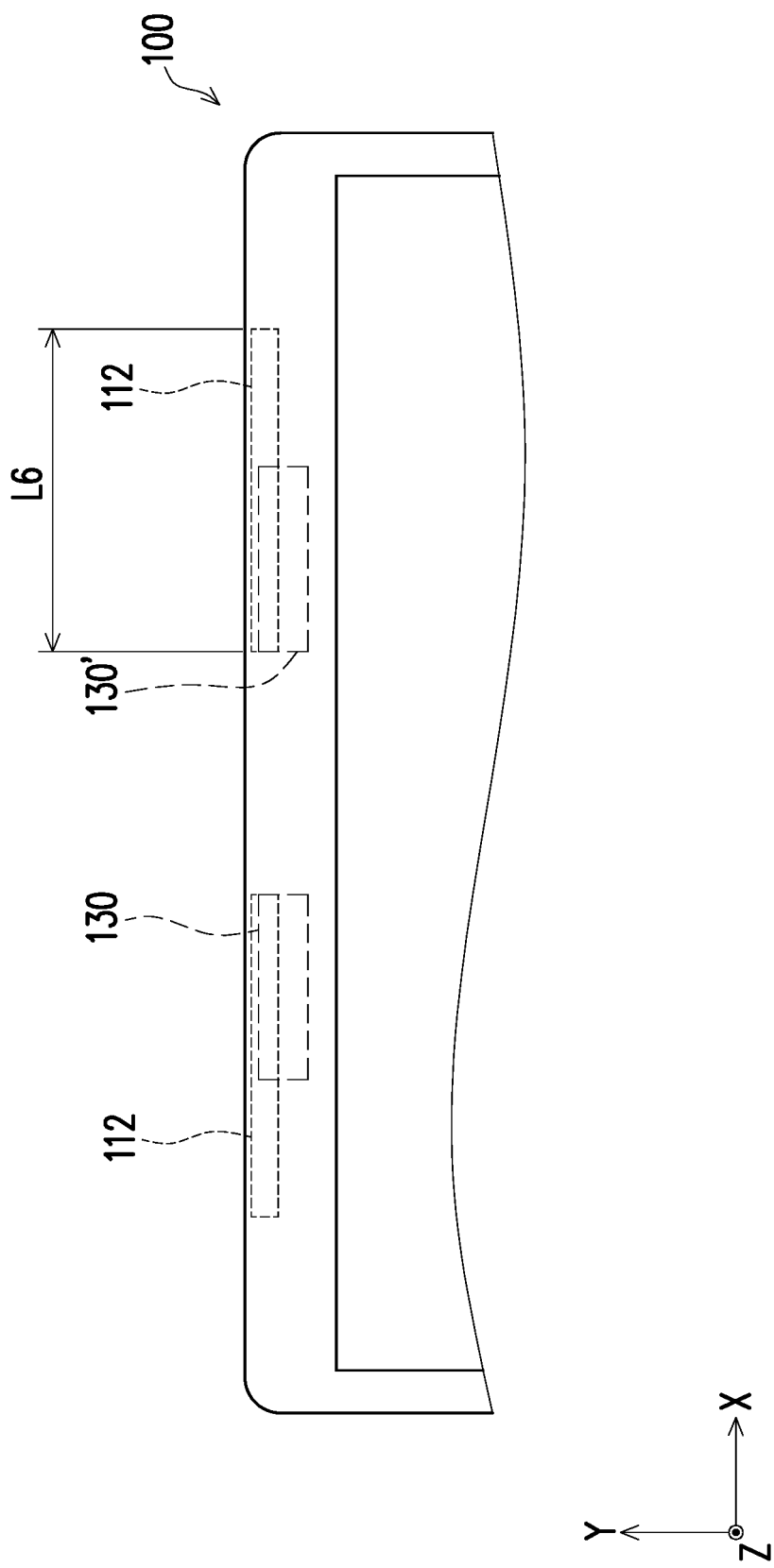
FIG. 5 is a schematic partial top view diagram of the electronic device of FIG. 1.

FIG. 5 is a schematic partial top view diagram of the electronic device of FIG. 1. Referring to FIG. 5, in this embodiment, the electronic device 100 may be provided with the two antenna modules 130 and 130', which are used as a main antenna and a secondary antenna, respectively, and the electronic device 100 includes the two slits 112. Each of the antenna modules 130 and 130' corresponds to one of the slits 112, and may have advantages described above.

Figure 6:
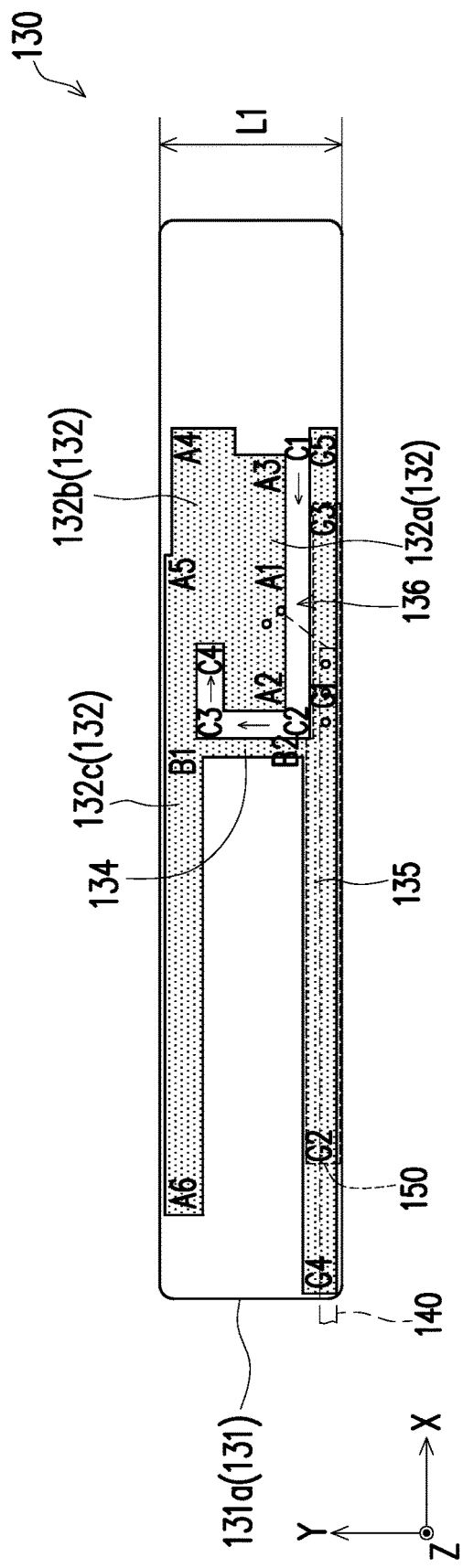
FIG. 6 is a schematic diagram of the antenna module of the electronic device of FIG. 1.

A pattern of the antenna module is introduced below. FIG. 6 is a schematic diagram of the antenna module of the electronic device of FIG. 1. Referring to FIG. 6, in this embodiment, the antenna module 130 includes a substrate 131, an antenna radiator 132, a first ground radiator 135, and a connection radiator 134. The substrate 131 includes a first surface 131a. The antenna radiator 132, the first ground radiator 135, and the connection radiator 134 are disposed on the first surface 131a. A length, the width L1, and a height of the substrate 131 are about 35 mm, 6.5 mm, and 0.4 mm, respectively.

The antenna radiator 132 includes a first section 132a (positions A2, A1, and A3), a second section 132b (positions A3 and A4), and a third section 132c (positions A4, A5, B1, and A6) that are sequentially connected. The first section 132a (the positions A2, A1, and A3), the second section 132b (the positions A3 and A4) and the third section 132c (the positions A4, A5, B1, and A6) form multiple bends. The first section 132a has a feeding end (the position A1).

The first ground radiator 135 (positions G4, G2, G1, G3, and G5) is disposed beside the antenna radiator 132. The conductor 150 is connected to the first ground radiator 135 (the positions G2 and G1). According to FIG. 6, two ends (the positions G4 and G5) of the first ground radiator 135 are located outside a projection of the conductor 150 onto the first surface 131a, and impedance matching at a high frequency may be adjusted in such a design.

The first section 132a of the antenna radiator 132 is located between the third section 132c and the first ground radiator 135. The connection radiator 134 (the positions B1 and B2) connects the third section 132c with the first ground radiator 135, so that a first slot 136 (positions C1, C2, C3, and C4) is formed among the first ground radiator 135, the first section 132a, the second section 132b, and a part of the third section 132c.

In this embodiment, by adjusting a length and a width of the first slot 136 (the positions C1, C2, C3, and C4) formed by a loop path of the positions A2, A1, A5, B1, B2, G1, G3, and G5, a center frequency and impedance matching of 6000 MHz to 6700 MHz (a second high frequency band) of Wi-Fi 6G may be adjusted for the antenna module 130.

In addition, by adjusting a length and a width of the second section 132b (the position A3 and A4), a center frequency of 6700 MHz to 7500 MHz (a third high frequency band) of Wi-Fi 6G may be adjusted for the antenna module 130.

Figure 7:
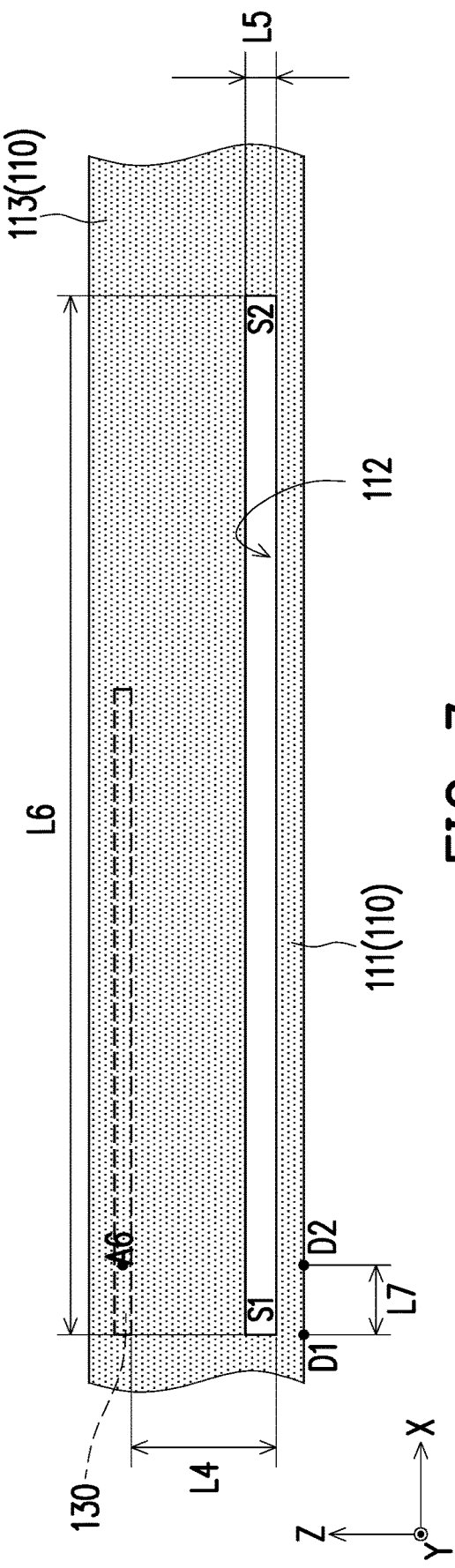
FIG. 7 is a schematic partial diagram of a side wall of a metal back cover of the electronic device of FIG. 1.

In addition, the third section 132c has a terminal (the position A6) far away from the second section 132b. FIG. 7 is a schematic partial diagram of a side wall of a metal back cover of the electronic device of FIG. 1. Referring to FIG. 7, in this embodiment, the slit 112 has a first end S1 and a second end S2 opposite to each other. A projection of the first end S1 onto the bottom wall 111 is marked as a position D1.

Returning to FIG. 6, in this embodiment, the antenna module 130 may tune the center frequency by adjusting the length and the width of the path of the positions B1 and A6. Specifically, referring to FIG. 1 (a cross-sectional diagram of the electronic device 100), FIG. 6 (a top view diagram of the antenna module 130), and FIG. 7 (a side view diagram of the metal back cover 110) together, a projection (a projection in the Z direction corresponding to a position D2) of the terminal (the position A6) of the third section 132c onto the bottom wall 111 is close to the first end S1 of the slit 112 and far away from the second end S2.

In addition, as shown in FIG. 6, a distance L7 between the projection (the position D2) of the terminal (the position A6) of the third section 132c onto the bottom wall 111 and the projection (the position D1) of the first end onto the bottom wall 111 is between 5 mm and between 10 mm. The distance L7 within the above range may resonate at a frequency band (a first high frequency band) of 5150 MHz to 6000 MHz for Wi-Fi 2.4G, and Wi-Fi 5G and 6G.

A coaxial transmission line 140 is disposed below the substrate 131. A positive end of the coaxial transmission line 140 is connected to the feeding end (the position A1), and a negative end of the coaxial transmission line 140 is connected to a ground end (the position G1) of the first ground radiator 135.

In this embodiment, the antenna module 130 may have the characteristics of a Wi-Fi 6E broadband antenna through the above configuration in cooperation with the first ground radiator 135 connected to the metal back cover 110 through the conductor 150 and the slit 112 on the metal back cover 110.

Figure 8:
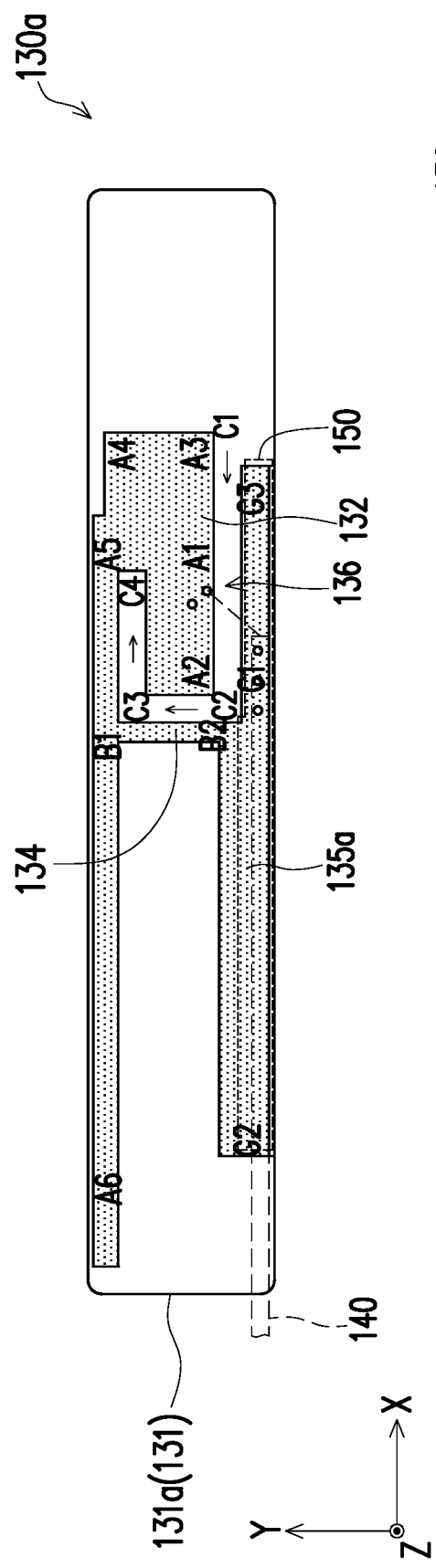
FIG. 8 is a schematic diagram of an antenna module according to another embodiment of the disclosure.
Figure 9:
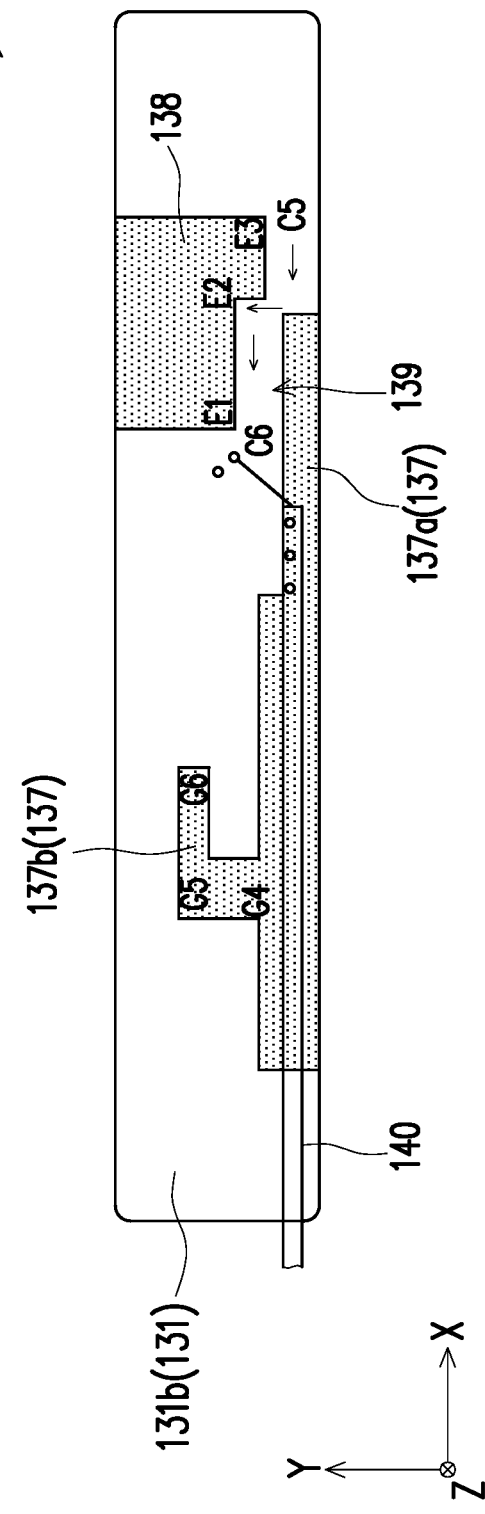
FIG. 9 is a schematic diagram of a backside of FIG. 8.

FIG. 8 is a schematic diagram of an antenna module according to another embodiment of the disclosure. FIG. 9 is a schematic diagram of a backside of FIG. 8. Referring to FIGS. 8 and 9, the main difference between an antenna module 130a in this embodiment and the antenna module 130 of FIG. 7 is that in this embodiment, a first ground radiator 135a is relatively short, and the area where the conductor 150 is connected to the first ground radiator 135a spans two ends (the positions G2 and G3) of the first ground radiator 135a.

In addition, as shown in FIG. 9, the antenna module 130a further includes a second ground radiator 137 and a floating radiator 138 (positions E1, E2, and E3). The substrate 131 has a second surface 131b opposite to the first surface 131a, and the second ground radiator 137 and the floating radiator 138 are disposed on the second surface 131b. The first ground radiator 135 (FIG. 8) may be connected to the second ground radiator 137 through a via hole.

The second ground radiator 137 includes a fourth section 137a and a fifth section 137b (positions G4, G5, and G6) extending from the fourth section 137a. According to FIGS. 8 and 9, a projection of the fourth section 137a onto the first surface 131a at least partially overlaps the first ground radiator 135. In this embodiment, the projection of the fourth section 137a onto the first surface 131a almost completely overlaps the first ground radiator 135.

As shown in FIG. 9, a second slot 139 (positions C5 and C6) is formed between the fourth section 137a and the floating radiator 138 (the positions E1, E2, and E3). In this embodiment, the antenna module 130a may adjust the center frequencies and the impedance matching of 6000 MHz to 6700 MHz and 6700 MHz to 7500 MHz for Wi-Fi 5G and 6G by adjusting a length and a width of the second slot 139 (a path of the position C5 and C6).

In addition, comparing FIG. 8 with FIG. 9, a projection of the fifth section 137b (the positions G4, G5, and G6) of the second ground radiator 137 onto the first surface 131a is located between the first ground radiator 135 and the third section 132c. The antenna module 130a may adjust the center frequency of 5150 MHz to 6000 MHz for Wi-Fi 2.4G and Wi-Fi 5G by adjusting a length and a width of the fifth section 137b (the positions G4, G5, and G6).

Figure 10:
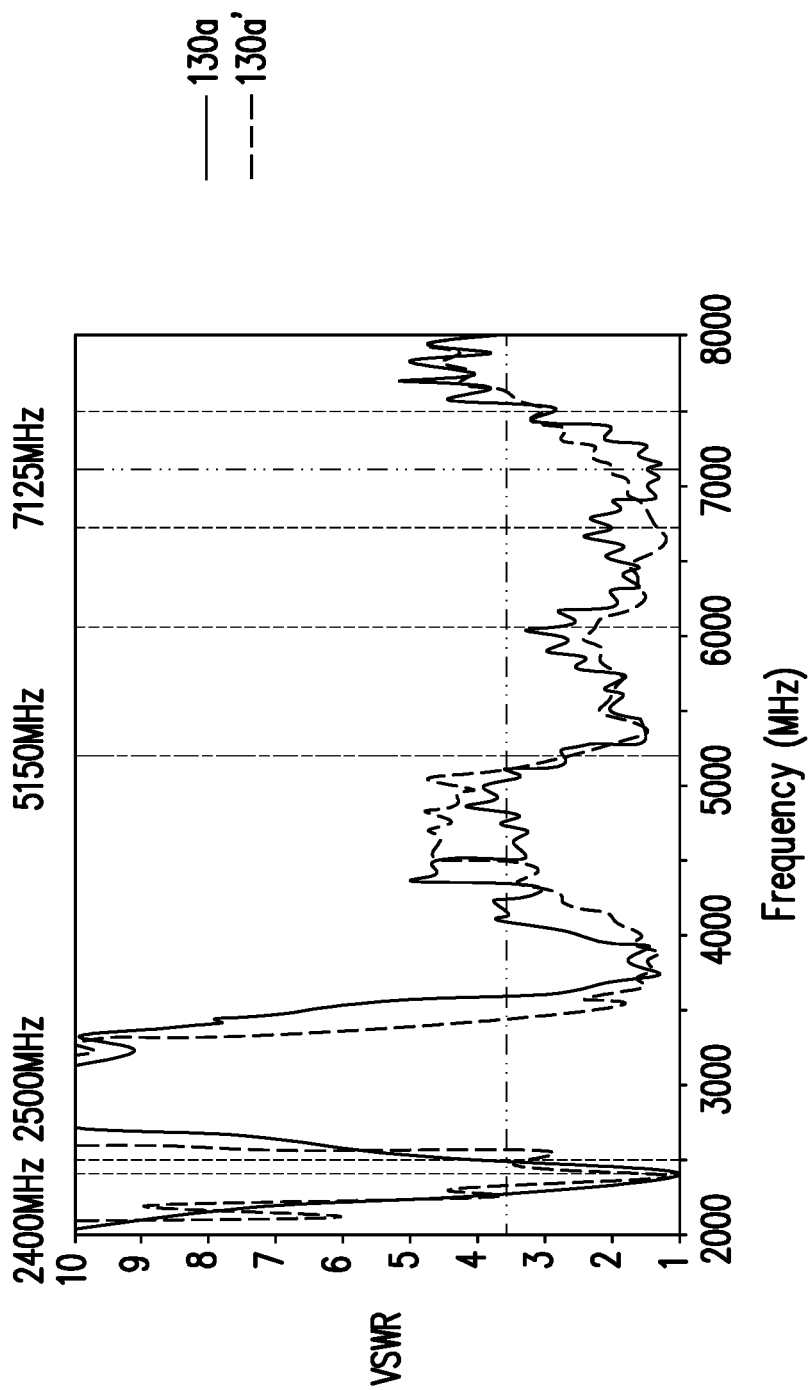
FIG. 10 is a frequency-VSWR diagram of the electronic device of FIG. 1 having two antenna modules of FIG. 8.

FIG. 10 is a frequency-VSWR diagram of the electronic device of FIG. 1 having two antenna modules of FIG. 8. It should be noted that in FIG. 10, the antenna module 130a is the main antenna, and an antenna module 130a' is the secondary antenna. The antenna patterns of two antenna modules 130a in FIG. 8 are used for the two antenna modules 130a and 130a', and are disposed according to the positions of the antenna modules 130 and 130' in FIG. 5. Referring to FIG. 10, voltage standing wave ratios (VSWR) of the two antenna modules 130a and 130a' for Wi-Fi 2.4G, and Wi-Fi 5G and 6G may be less than 3.5 and have the good performance.

Figure 11:
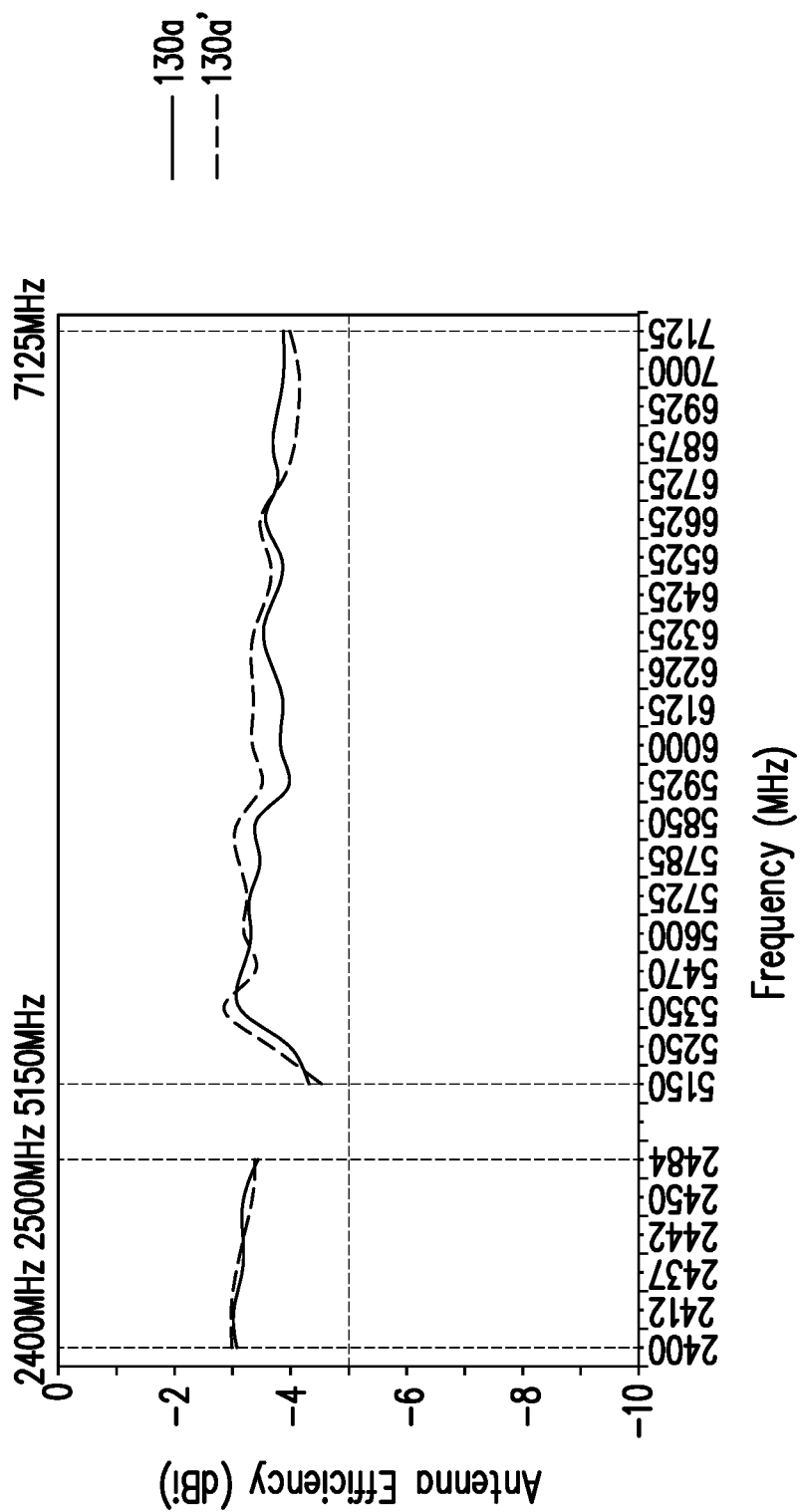
FIG. 11 is a frequency-antenna efficiency diagram of the electronic device of FIG. 1 using the two antenna modules of FIG. 8.

FIG. 11 is a frequency-antenna efficiency diagram of the electronic device of FIG. 1 having the two antenna modules of FIG. 8. Similarly, the antenna module 130a is the main antenna, and the antenna module 130a' is the secondary antenna. The antenna patterns of the two antenna modules 130a in FIG. 8 are used for the two antenna modules 130a and 130a', and are disposed according to the positions of the antenna modules 130 and 130' in FIG. 5.

Referring to FIG. 11, the antenna efficiency of the two antenna modules 130a and 130' for Wi-Fi 2.4G (2400 to 2500 MHz) is −3 to −3.5 dBi, which may be greater than −4 dBi (in which the antenna efficiency may be improved by 4 to 5 dBi). The antenna efficiency of the two antenna modules 130a and 130' for Wi-Fi 5G and 6G (5150 to 7125 MHz) is −3.1 to −4.5 dBi, which may be greater than −5 dBi, and has the good performance on the antenna efficiency.

Figure 12:
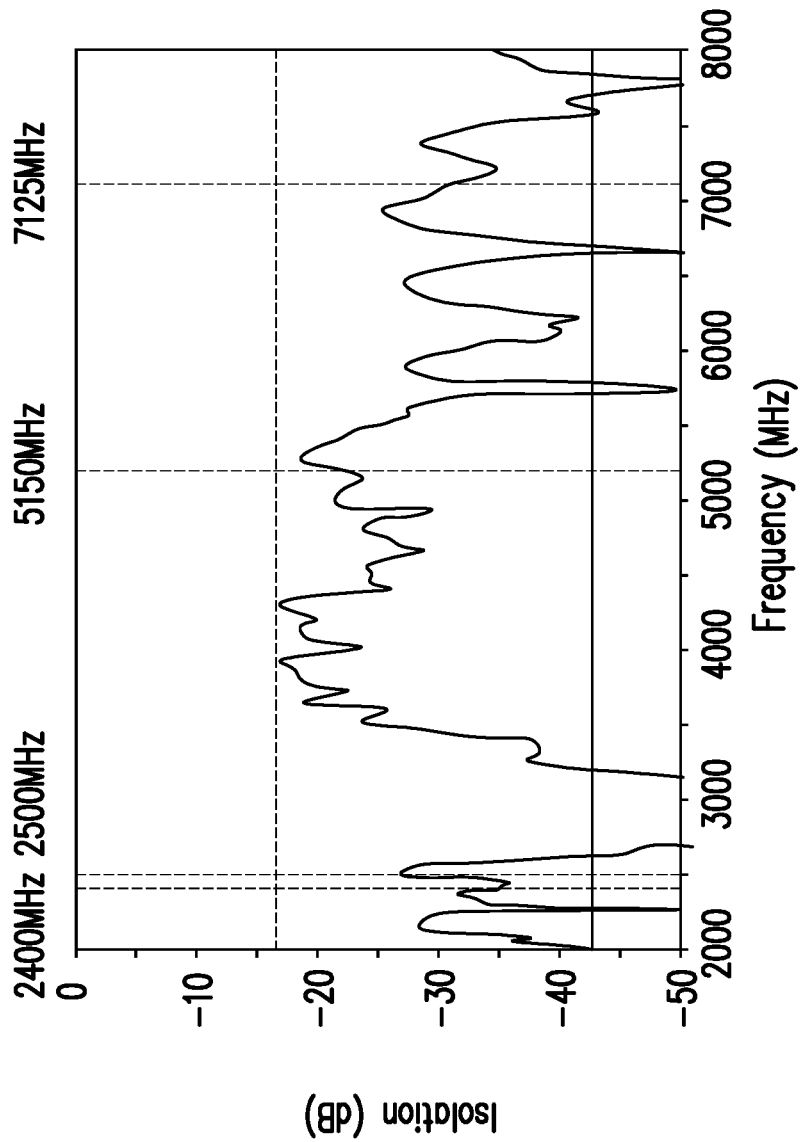
FIG. 12 is a frequency-isolation diagram of the electronic device of FIG. 1 having the two antenna modules of FIG. 8.

FIG. 12 is a frequency-isolation diagram of the electronic device of FIG. 1 having the two antenna modules of FIG. 8. Referring to FIGS. 5 and 12, in this embodiment, the two antenna modules 130a and 130' are equipped with the two independent slits 112 (FIG. 5). Therefore, the two antenna modules 130a and 130' have good isolation (which both may be below −15 dB) for Wi-Fi 2.4G, and Wi-Fi 5G and 6G.

Based on the above, the metal back cover is used for the electronic device in the disclosure, and the electronic device has the fine-looking appearance. In the conventional electronic device with the metal back cover, there is no slot on the metal back cover. The antenna efficiency is affected by the metal back cover, and the power of the antenna module is convergent in the direction toward the front side of the electronic device. The metal back cover of the electronic device in the disclosure is provided with the slit, so that the power of the antenna module is not convergent in the single axial direction, and the antenna efficiency may be improved. Furthermore, since the distance between the antenna module on the inside of the metal back cover and the slit is between 5 mm and 8 mm, there is a certain distance kept between the antenna module and the metal back cover, which may reduce the influence of the metal back cover on the performance of the antenna module, and is also different from the conventional resonance mechanism in which the antenna is closely attached to the slot for resonance. In addition, the first ground radiator of the antenna module is disposed beside the antenna radiator, and the first section of the antenna radiator is located between the third section and the first ground radiator. The first slot is formed among the first ground radiator of the antenna module, the first section, the second section, and the part of the third section. With the above design, the antenna module may resonate at multiple frequency bands.

What is claimed is:

1. An electronic device, comprising: a metal back cover comprising a slit; and an antenna module located on the inside of the metal back cover and separated from the metal back cover, wherein the antenna module comprises: an antenna radiator comprising a first section, a second section, and a third section that are sequentially connected, wherein the first section has a feeding end, and the first section, the second section, and the third section form a plurality of bends; a first ground radiator disposed beside the antenna radiator, wherein the first section is located between the third section and the first ground radiator; and a connection radiator connecting the third section and the first ground radiator, so that a first slot is formed among the first ground radiator, the first section, the second section, and a part of the third section, and a length and a width of the first slot are associated with a center frequency and impedance matching of a second high frequency band, wherein the antenna module comprises a substrate, a second ground radiator, and a floating radiator, the substrate has a first surface and a second surface opposite to each other, the antenna radiator, the connection radiator, and the first ground radiator are disposed on the first surface, the second ground radiator and the floating radiator are disposed on the second surface, and the first ground radiator is connected to the second ground radiator.

2. The electronic device according to claim 1, wherein the second ground radiator comprises a fourth section, a projection of the fourth section onto the first surface at least partially overlaps the first ground radiator, a second slot is formed between the fourth section and the floating radiator, a length and a width of the second slot are associated with the center frequency and the impedance matching of the second high frequency band and a center frequency and impedance matching of a third high frequency band.

3. The electronic device according to claim 2, wherein the second ground radiator comprises a fifth section extending from the fourth section, a projection of the fifth section onto the first surface is located between the first ground radiator and the third section, and the fifth section is associated with a center frequency of a first high frequency band.

4. The electronic device according to claim 1, wherein the metal back cover comprises a bottom wall and a side wall connected to the bottom wall, and the slit is formed between the bottom wall and the side wall.

5. The electronic device according to claim 4, wherein the slit has a first end and a second end opposite to each other, the third section has a terminal, and a distance between a projection of the terminal onto the bottom wall and a projection of the first end onto the bottom wall is between 5 mm and 10 mm.

6. The electronic device according to claim 4, wherein a distance between the antenna module and the bottom wall is between 7 mm and 10 mm, and a distance between the antenna module and the side wall is between 0.4 mm and 1.5 mm.

7. The electronic device according to claim 1, wherein the antenna module excites at a low frequency band, and a length of the slit is between 0.5 times and 0.75 times a wavelength of the low frequency band.

8. The electronic device according to claim 1, further comprising: a conductor connected to the first ground radiator and the metal back cover.

9. The electronic device according to claim 8, wherein a substrate has a first surface, the antenna radiator, the connection radiator, and the first ground radiator are disposed on the first surface, and two ends of the first ground radiator are located outside a projection of the conductor onto the first surface.

10. The electronic device according to claim 1, wherein a distance between the antenna module and the slit is between 5 mm and 8 mm.

* * * * *